(12) United States Patent
Bertoldo et al.

(10) Patent No.: US 12,427,700 B2
(45) Date of Patent: Sep. 30, 2025

(54) FORMING APPARATUS AND METHOD FOR FORMING A CONTINUOUS TUBULAR ROD

(71) Applicant: PHILIP MORRIS PRODUCTS S.A., Neuchatel (CH)

(72) Inventors: Massimiliano Bertoldo, Castel Maggiore (IT); Fabio Cantieri, Bologna (IT); Ivan Prestia, Calderara di Reno (IT)

(73) Assignee: Philip Morris Products S.A., Neuchatel (CH)

( * ) Notice: Subject to any disclaimer, the term of this patent is extended or adjusted under 35 U.S.C. 154(b) by 784 days.

(21) Appl. No.: 17/599,278

(22) PCT Filed: Mar. 24, 2020

(86) PCT No.: PCT/EP2020/058147
§ 371 (c)(1),
(2) Date: Sep. 28, 2021

(87) PCT Pub. No.: WO2020/193543
PCT Pub. Date: Oct. 1, 2020

(65) Prior Publication Data
US 2022/0152883 A1 May 19, 2022

(30) Foreign Application Priority Data
Mar. 28, 2019 (EP) .................... 19165790

(51) Int. Cl.
*B29C 35/04* (2006.01)
*B29D 99/00* (2010.01)
*A24D 3/02* (2006.01)

(52) U.S. Cl.
CPC ........ *B29C 35/049* (2013.01); *B29D 99/0046* (2013.01); *A24D 3/022* (2013.01); *A24D 3/0233* (2013.01); *A24D 3/0295* (2013.01)

(58) Field of Classification Search
CPC .... A24D 3/022; A24D 3/0233; A24D 3/0295; B29C 35/049; B29D 99/046
See application file for complete search history.

(56) References Cited

U.S. PATENT DOCUMENTS

| 3,560,298 A | 2/1971 | McArthur | |
| 4,270,962 A * | 6/1981 | Sugihara | D04H 3/04 |
| | | | 156/441 |

(Continued)

FOREIGN PATENT DOCUMENTS

| CN | 103340220 A * | 10/2013 |
| CN | 203435668 | 2/2014 |

(Continued)

OTHER PUBLICATIONS

International Preliminary Report on Patentability for PCT/EP2020/058147 mailed May 31, 2021 (15 pages).

(Continued)

*Primary Examiner* — Anna K Kinsaul
*Assistant Examiner* — David G Shutty
(74) *Attorney, Agent, or Firm* — Mueting Raasch Group (57) ABSTRACT

The forming apparatus comprises a feed path for continuously feeding a continuous tow material along a transport direction, a forming device connected to a downstream end of the feed path and adapted to form the continuous tow material into a continuous tubular rod. The forming device comprises a tubular element adapted to allow the continuous tow material to pass through the tubular element to form the continuous tubular rod and a steam generator adapted to generate overheated steam. The steam generator is in fluid connection with the tubular element to provide overheated steam to the continuous tow material. The forming device further comprises several fluid conduits to provide overheated steam from the steam generator to several injection sites arranged along a length of the tubular element, wherein (Continued)

at least one fluid conduit of the several fluid conduits comprises a temperature control unit including a temperature sensor and a temperature influencer.

9 Claims, 3 Drawing Sheets

(56) References Cited

U.S. PATENT DOCUMENTS

| | | | |
|---|---|---|---|
| 4,631,163 | A | 12/1986 | Jakobsen |
| 10,779,565 | B2 | 9/2020 | Caprini |
| 2014/0034571 | A1* | 2/2014 | Torai ................ B31D 5/0082 493/393 |
| 2017/0325496 | A1 | 11/2017 | Park |

FOREIGN PATENT DOCUMENTS

| | | | | |
|---|---|---|---|---|
| CN | 1084711803 | | 8/2018 | |
| DE | 102017107119 | A1 * | 10/2018 | ............... A24D 3/00 |
| EP | 0 084 274 | | 7/1983 | |
| EP | 0 325 630 | | 9/1991 | |
| EP | 3123877 | | 2/2017 | |
| JP | 2003269400 | A * | 9/2003 | |
| KR | 2017-0075849 | | 7/2017 | |
| WO | WO 02/14044 | | 2/2002 | |
| WO | WO-0214044 | A1 * | 2/2002 | ......... B29C 44/3446 |
| WO | WO 2016/097016 | | 6/2016 | |
| WO | WO 2017/032755 | | 3/2017 | |
| WO | WO 2017/089514 | | 6/2017 | |
| WO | WO 2017/093131 | | 6/2017 | |
| WO | WO-2017089514 | A1 * | 6/2017 | ............... A24D 3/02 |
| WO | WO-2017093131 | A1 * | 6/2017 | ............... A24D 3/02 |
| WO | WO 2017/198995 | | 11/2017 | |
| WO | WO 2018/206490 | | 11/2018 | |
| WO | WO 2018/210982 | | 11/2018 | |

OTHER PUBLICATIONS

PCT International Search Report and Written Opinion for PCT/EP2020/058147 dated Jun. 4, 2020 (11 pages).

Office Action issued in China for Application No. 202080024778.X dated Nov. 18, 2023 (20 pages). English translation included.

* cited by examiner

FORMING APPARATUS AND METHOD FOR FORMING A CONTINUOUS TUBULAR ROD

This application is a U.S. National Stage Application of International Application No. PCT/EP2020/058147 filed Mar. 24, 2020, which was published in English on Oct. 1, 2020, as International Publication No. WO 2020/193543 A1. International Application No. PCT/EP2020/0058147 claims priority to European Application No. 19165790.7 filed Mar. 28, 2019.

The invention relates to a forming apparatus and a method for forming a tubular rod from a tow material.

There are known apparatus and methods for forming hollow acetate tubes by using plasticizer. Typically, plasticizer is spread onto acetate tow. The treated tow is then heated and formed into a rod shape. Heat treatment with steam followed by cooling with air stabilizes the tow material in its rod shape. While heat treatment with saturated steam provides high and rapid heat transfer to the tow material, it also may create water droplets. Water droplets may negatively affect the material and the rod forming process.

It is desirable to have a forming apparatus and a method improving the forming process of a tubular rod. In particular, it is desirable to have better control of the forming process to improve the quality and consistency of formed rods.

According to the invention, there is provided a forming apparatus comprising a feed path for continuously feeding a continuous tow material along a transport direction and a forming device connected to a downstream end of the feed path and adapted to form the continuous tow material into a continuous tubular rod. The forming device comprises a tubular element adapted to allow the continuous tow material to pass through the tubular element to form the continuous tubular rod. The forming device also comprises a steam generator adapted to generate overheated steam, wherein the steam generator is in fluid connection with the tubular element to provide overheated steam to the continuous tow material. The forming device further comprises several fluid conduits to provide overheated steam from the steam generator to several injection sites arranged along a length of the tubular element. At least one fluid conduit of the several fluid conduits comprises a temperature control unit including a temperature sensor and a temperature influencer.

The overheated steam is provided from the steam generator via a distribution system comprising the several fluid conduits to the forming device. Preferably, two to ten fluid conduits, more preferably three to seven fluid conduits, for example five fluid conduits are available in the distribution system of the forming apparatus of the present invention. For example, a fluid conduit may be a pipe, tube or channel or a combination of pipes, tubes and channels.

The temperature control unit may be arranged in the forming apparatus between the steam generator and the tow material in the tubular element. Preferably, the temperature control unit, in particular a temperature sensor, is arranged close to the position where the tow material is treated with overheated steam. This advantageously allows to very precisely measure the temperature of the steam acting on the tow material. With a temperature influencer present close to the injection site of the overheated steam, temperature differences of the overheated steam at the injection site to a desired temperature of steam that shall be acting on the tow material may be set or adjusted by the temperature influencer. The temperature influencer may be used, for example, to make up for temperature losses of the overheated steam delivered from the generator to the tow material. For example, temperature losses may be caused by environmental influences acting on the forming apparatus or a path length the overheated steam has to travel. The temperature influencer may also be used to generally heat or cool the overheated steam provided by the steam generator. By this, a generator may be set to produce strongly overheated steam or less overheated steam and individual adaption of the temperature of the overheated steam is performed in the individual fluid conduits close to the injection site of the overheated steam. By using a temperature control unit, also steam generators may be used that are not capable of providing overheated steam in a desired temperature range. The missing heat that is needed to reach the desired temperature range may then be achieved by the temperature control unit.

Preferably, the temperature control unit is arranged as close as possible to the tow material to be treated in order to keep temperature losses of the overheated steam as low as possible. Advantageously, in this way measured temperatures correspond precisely to the actual temperature of the overheated steam acting on the tow material.

Preferably, the temperature control unit is arranged in an end section of a fluid conduit at the injection site of the overheated steam.

Preferably, an injection end of the at least one fluid conduit, which fluid conduit comprises the temperature control unit, comprises a nozzle. Preferably the injection end of the at least one fluid conduit is formed as a nozzle. Over a nozzle the overheated steam may very efficiently be introduced into and spread over the tow material. In particular, when using a fibrous tow material, the overheated steam may very effectively push plasticizer molecules in between the fibres of the tow material, where the plasticizer molecules are liquefied.

Preferably, the temperature sensor is arranged in the nozzle.

A temperature influencer may be a heating device, which is able to heat the overheated steam, a cooling device, which is able to cool the overheated steam or a heating and cooling device, which is able to either heat or cool the overheated steam as required.

Preferably, the temperature influencer is a heating and cooling device. Overheated steam may then be heated or cooled depending on the temperature of the overheated steam provided by the steam generator and depending on a temperature or pressure desired at a specific location of the tow material and at a specific state of the forming process.

A heating device or a cooling device may be electric devices, for example a resistive heater, an inductor and for example an inductively heatable fluid conduit or a Pelletier element. Heating or cooling devices may also be based on fluid heating or fluid cooling.

Preferably, a heating device is a resistive heater arranged around the fluid conduit.

Preferably, a combined heating and cooling device is based on fluid heating and fluid cooling. For example, an external tube may be arranged around a fluid conduit. A cooling or heating fluid may be guided along the fluid conduit between the external tube and the outside of the fluid conduit, thereby cooling or heating the fluid conduit and the overheated steam flowing inside the fluid conduit.

A temperature influencer may be arranged inside a fluid conduit, for example at an inner wall of the fluid conduit, in a fluid conduit wall or outside of the fluid conduit, for example arranged around the fluid conduit. If an external temperature influencer is used, preferably the material of the fluid conduit comprises high heat conductivity at least in the region of the external temperature influencer.

More than one fluid conduit of the several fluid conduits, for example three or four or even each fluid conduit of the several fluid conduits may comprise a temperature control unit. Preferably, more than one fluid conduit or all fluid conduits comprise a temperature control unit. Advantageously, in this way, the forming process may be very closely controlled, for example changed or adapted in order to achieve an optimised result.

The forming apparatus may be used for rod forming of various continuous materials, in particular when provided with different plasticizers or different hardening agents. The close control allows to adapt the forming process to various hardening regimes of material combinations used in the forming apparatus of the present invention.

Preferably, each temperature control unit is operated individually and independently of other temperature control units. Thus, preferably, the temperature is controllable individually in more than one fluid conduits. Preferably, the temperature is controllable individually in each fluid conduit provided with a temperature control unit. Preferably, the temperature control units are mutually coordinated such that the cooling process of the tow material or of the formed rod may closely be controlled and successively be influenced if needed.

Preferably, the amount of overheated steam provided from the steam generator to the one or several fluid conduits is controlled for each fluid conduit. For example, each fluid conduit may be provided with a valve. In such embodiments, the valve may preferably individually be controlled. For example, the steam distribution system comprises a manifold connected to the steam generator at an inlet end of the manifold and connected to the several fluid conduits at several outlets ends of the manifold. The valves may be arranged close to each outlet end of the manifold. For example by the provision of valves a certain amount of overheated steam or a larger amount of overheated steam may be provided to upstream arranged fluid conduits (upstream relative to the transport path of the tow material) to enhance a heating effect, while downstream arranged fluid conduits may, for example, be provided with a smaller amount of overheated steam, or vice versa.

The forming apparatus may also comprise a pressure control unit to control the pressure of the overheated steam provided to the tubular element and to the tow material, respectively. Since pressure and temperature are not independent parameters, control of the manufacturing process of the tubular rod may be improved if temperature and pressure of the overheated steam close to an injection site of the overheated steam is controlled.

Preferably, at least one fluid conduit of the several fluid conduits comprises a pressure control unit comprising a pressure sensor and a pressure influencer.

Preferably, a pressure control unit, in particular a pressure sensor, is arranged close to the position where the tow material is treated with overheated steam. This advantageously allows to very precisely measure the pressure of the overheated steam acting on the tow material. A pressure influencer present close to the injection site of the overheated steam allows to set or adjust pressure differences of the overheated steam at the injection site to a desired pressure of overheated steam acting on the tow material.

The pressure influencer may be used, for example, to make up for pressure losses between a steam generator and the tow material. For example pressure losses may be caused by pressure drops in the steam distribution system of the forming apparatus. The pressure influencer may also be used to generally further pressurise or diminish the pressure of the overheated steam provided by the steam generator. By this, a steam generator may be set to produce overheated steam to a pre-set value, for example an average value. Preferably, individual adaption of the pressure of the overheated steam is performed in the individual fluid conduits close to the injection site of the steam. By using a pressure control unit, also steam generators may be used that are not capable of providing overheated steam in a desired pressure range. The desired pressure range may then be achieved by the pressure control unit.

Preferably, a pressure sensor is arranged upstream of the pressure influencer. By this, a measured pressure value of the pressure sensor may directly be used to activate the pressure influencer.

The pressure influencer may be a pressure enhancer or a pressure diminisher or a pressure enhancer and diminisher.

Preferably, the pressure influencer is a pressure regulator adapted and capable to diminish a pressure, more preferably adapted and capable to diminish or enhance a pressure, in the fluid conduit.

A pressure regulator may, for example, be a restrictor restricting a passage of overheated steam in the fluid conduit.

A pressure regulator may, for example, be an activatable propeller arranged in the fluid conduit. Working as a pressure diminisher, the propeller may slow down a flow of overheated steam passing the fluid conduit. Working as a pressure enhancer, the propeller may accelerate a flow of overheated steam passing the fluid conduit. A propeller may also be used to vary the speed of overheated steam passing through the fluid conduit.

Preferably, at least one of the pressure regulators comprises or is a propeller arranged in the fluid conduit.

A pressure influencer may, for example, also be a valve arranged in the fluid conduit.

Preferably, the at least two fluid conduits are provided with the same type of pressure influencer.

More than one fluid conduit of the several fluid conduits, for example three or four fluid conduits or preferably even each fluid conduit of the several fluid conduits may comprise a pressure control unit. If more than one fluid conduit or even all fluid conduits comprise a pressure control unit, a forming process may very closely be controlled. In particular, the forming process may be changed or adapted to achieve an optimised result.

The tubular element of the forming device may comprise a plurality of tubular element segments. Preferably, each tubular element segment of the plurality of tubular element segments comprises an injection site. Thus, each tubular element segment may be connected to at least one fluid conduit for providing overheated steam to the tow material passing the tubular element segment. One fluid conduit may be provided per tubular element segment.

Tubular rods, filled or hollow rods may be manufactured with the forming device of the forming apparatus. For manufacturing a hollow rod, the tubular element comprises an inner core or mandrel for forming a continuous hollow tubular rod from the continuous tow material. Preferably, the mandrel is arranged concentrically inside the tubular element or inside one, several or all tubular element segments.

Preferably, the formed rod is cooled in order to harden the plasticiser and to fix the rod in its tubular rod shape. Cooling may be achieved by the provision of air to the tubular rod. Preferably, cooling is performed by using pressurized air provided to the rod formed from the tow material.

Therefore, the forming apparatus may comprise a pressurized air source, such as for example a pressurized air generator, to provide pressurized air to the continuous tubular rod to cool the continuous tubular rod. Preferably, cooling is performed after heating, that is, downstream of the heating process. Cooling may be performed in the tubular element or downstream of the tubular element. For example, pressurised air may be provided to the tubular rod via one of the several fluid conduits, for example to a most downstream arranged injection site via a most downstream arranged fluid conduit. If the tubular element comprises several tubular element segments, one tubular element segment, for example the most downstream arranged tubular element segment may be connected to a fluid conduit for providing cooling air, for example pressurized air, to the rod formed in the more upstream arranged tubular element segments. Cooling air accelerates a curing of plasticiser and may thus quickly stabilize the continuous rod in its rod form.

While the cooling has been described using pressurized air, it is understood that pressurized air may also be used for heating and that also other gases suitable for cooling or heating may be used. In particular compressed gases that are compressed using a gas compressor could be used alternatively or in addition, for example, pressurized carbon dioxide or nitrogen.

According to the invention, a mandrel may be provided within the tubular element or within one or several of the tubular element segments. A mandrel can be used to create an interior shape within the formed rod, for example to create a so called hollow acetate tube or HAT. In some embodiments, the mandrel comprises a circular cross section, however other cross sections are possible, for example in the form of a polygon like a triangle, square, star or others, in the form of type or icons like for example hearts, clubs or diamonds or other round, oval or semi-round forms. Additionally, the cross-section of the mandrel may be continuous. Alternatively, the cross-section of the mandrel may change over the length of the mandrel. Preferably, the mandrel extends across all tubular element segments provided with overheated steam or across a length of the tubular element that is heated. This advantageously aids in bringing the tow into the desired form while it is still hot. Preferably, the mandrel extends into at least one of the tubular element segments, which is provided with pressurized air for cooling. This advantageously allows the tow to settle into the desired form. Preferably, the mandrel does not extend into at least one tubular element segment, which is provided with pressurize air for cooling. This advantageously facilitates the removal of the tow from the mandrel.

In other embodiments of the invention, the tubular element or at least one of the tubular element segments comprises a formed inner tube located within the tubular element or within the tubular element segment, such that the tow passing through the tubular element segment passes along the inner surface of the formed inner tube. The formed inner tube may thus impart its form onto the outside of the tow during the forming. For example, the formed inner tube comprises a circular cross section, however other cross sections are possible, for example in the form of a polygon like a triangle, square, star or others, in the form of type or icons like for example hearts, clubs or diamonds or other round, oval or semi-round forms. Particularly advantageously, the formed inner tube creates a number of flutes along the periphery of the formed tow.

Additionally, the cross-section of the inner surface of the formed inner tube may be continuous. Alternatively, the cross-section of the formed inner tube may change over the length of the formed inner tube. A changing cross section may for example create helical flutes along the periphery of the formed tow.

Preferably, the forming apparatus comprises a main control system. The main control system controls the forming process of the continuous rod. For example, data from the temperature control unit or control units, where available also data from the pressure control unit or control units, where available data from valves and preferably also data from the final formed rod is received in the main control system. Data from the final formed rod may, for example, be a rod diameter gained from a line-scan camera. In the main control system, the data may be analysed and if deviations from a desired result are detected, the forming parameters may be adjusted. The main control unit may accordingly give instructions to the temperature control units, pressure control units, valves or further elements of the forming apparatus, for example a steam distribution system or a plasticizer applicator. The main control unit may be used to control further devices of a manufacturing line in a rod forming process, for example a cutting device for cutting the continuous rod into individual segments. Via the main control system, forming parameters, such as pressure applied to the tow material, heating or cooling may be controlled, adjusted and recorded.

While overheated steam is provided via a steam distribution system to the tubular element of the forming device, the same distribution system or a separate distribution system may be used to provide pressurized air to the tow material.

Preferably, overheated steam as well as pressurized fluid is provided via several injection sites to the tow material for example injection sites arranged over the length of the tubular element.

With a steam generator in the forming apparatus, the distribution system and fluid conduits of the distribution system are used for guiding overheated steam to the tow material and the temperature control unit or control units and pressure control unit or control units are used for controlling the temperature and pressure of the overheated steam.

Is additionally a gas compressor used in the forming apparatus and the distribution system and fluid conduits of the distribution system used for guiding pressurized air to the tow material, then the temperature control unit or control units and pressure control unit or control units may be used for controlling the temperature and pressure of the pressurized air.

Is a steam generator as well as a gas compressor used in the forming apparatus, both fluid compressors may be connected to the same distribution system. Overheated steam and pressurized air may be guided through the same or through different fluid conduits in the distribution system. Accordingly, the pressure control units and temperature control units may control the pressure and temperature of overheated steam and of pressurized air.

Preferably, overheated steam and pressurized air are guided through different fluid conduits in the same distribution system. Preferably, overheated steam is guided through fluid conduits leading to more upstream arranged injection sites of the tubular element. Preferably, pressurized gas is guided through fluid conduits leading to more downstream arranged injection sites of the tubular element. Preferably, overheated steam is provided to the two to three most upstream arranged injection sites of the tubular element. Preferably, pressurized air is provided to at least the most downstream arranged injection site of the tubular element.

The invention also refers to a method for forming a continuous tubular rod from a continuous tow material. The method comprises providing a continuous tow material, forming the continuous tow material to a continuous tubular rod and heating the continuous tow material during forming by providing overheated steam from a steam generator via a steam distribution system to the continuous tubular rod. The method further comprises the steps of measuring the temperature of the overheated steam in the steam distribution system at an injection site of the overheated steam to the continuous tubular rod and providing a temperature influencer in the steam distribution system downstream of the steam generator. The temperature influencer is capable of and adapted to changing a temperature of the overheated steam delivered from the steam generator to the continuous tow material during forming.

Preferably, the method comprises heating or cooling the overheated steam delivered from the steam generator before delivering the overheated steam to the continuous tow material.

Preferably, the method comprises measuring the temperature of the overheated steam at several injection sites along a forming path of the continuous tow material.

Preferably, the method further comprises measuring the pressure of the overheated steam at at least one of the injection sites and providing a pressure influencer in the distribution system of the overheated steam. The pressure influencer is capable of and adapted to changing the pressure of the overheated steam. A pressure influencer may diminish or enhance a pressure in the fluid conduit. Preferably, the pressure influencer can diminish the pressure of the overheated steam delivered to the continuous tow material.

The method may further comprise the step of applying plasticizer to the continuous tow material before forming the continuous tubular rod. The application of plasticizer to tow material before forming the material into a rod influences the rod material. For example, plasticizers may improve the forming characteristics of the tow material, may enhance stability of the final rod or may influence a resistance to draw of the formed rod or combinations of these effects.

The method may further comprise the step of cutting the continuous tubular rod into individual segments. The individual segments may have a final length of a segment of an aerosol-generating article. The individual segments may also have a multiple-length of a final length and may be cut to their final length in a further process step in the manufacturing process of aerosol-generating articles.

Preferably, the continuous tow material is cellulose acetate.

Preferably, the continuous tubular rod is a continuous hollow acetate tube (HAT).

The invention also refers to a manufacturing line for manufacturing a continuous tubular rod. The manufacturing line comprises a forming apparatus according to the invention and as described herein. The manufacturing line further comprises a plasticiser application device arranged upstream of the forming apparatus. The plasticiser application device is provided for applying plasticiser to the continuous tow material. The manufacturing line may further comprise a cutting device arranged downstream of the forming device for cutting the continuous tubular rod into individual rod segments.

The invention is further described with regard to embodiments, which are illustrated by means of the following drawings, wherein.

Figure 1:
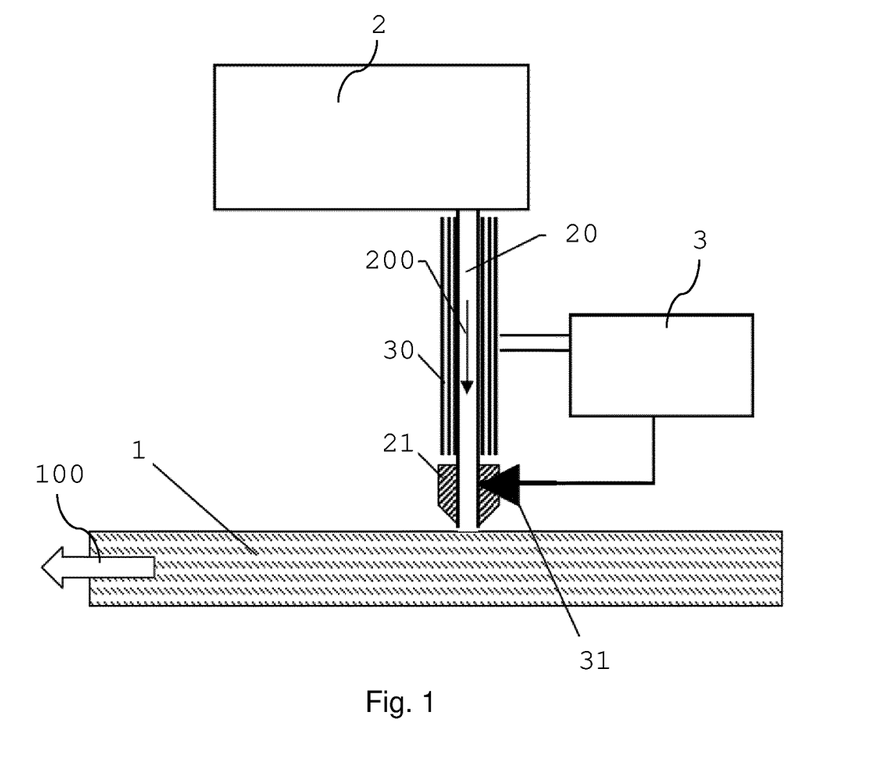
FIG. 1 is a schematic view of a forming apparatus with temperature control unit.

In FIG. 1 the continuous material 1, for example tow material impregnated with a plasticizer, for example triacetin, is guided along the transport direction 100. The continuous material is guided through a tubular element (not shown) and thereby treated with overheated steam.

The overheated steam is generated in a steam generator 2 and guided via steam distribution system to the tow material 1. The overheated steam is guided to the tubular element where the tow material is passing through and thereby formed into a rod. The flow direction of the overheated steam is shown by arrow 200.

Typically, the steam distribution system comprises a manifold distributing the overheated steam from the steam generator 2 into a plurality of individual pipes 20. In FIG. 1 a single end portion of a steam distribution system is shown as fluid conduit in the form of one pipe 20. The pipe 20 ends in a nozzle 21 focussing the overheated steam to the tow material 1. This end portion of the steam distribution system is provided with a temperature control unit 3. The temperature control unit 3 comprises a heating element 30, for example a resistive heating element, surrounding the pipe 20. The temperature control unit 3 also comprises a temperature sensor 31 arranged in the nozzle 21. The temperature control unit 3 may also comprise a data control system and a power system for retrieving data from the temperature sensor 31 and from the heating element 30 and for providing the heating element 30 with heating power when needed to heat the overheated steam to a higher temperature and also to a higher pressure. The pipe 20 is made of a material to resist the heat of the overheated steam as well as the heat provided by the heating element 30.

While the steam distribution system and temperature control is shown in FIG. 1 by way of one pipe 20 provided with a temperature control system 3, the steam distribution system preferably comprises several individual pipes that may be provided with their own individually controlled temperature control unit.

Data control system and power system for the temperature control unit 3 may also be integrated in a main control system provided for control of the forming apparatus and possibly also further devices used in the rod manufacturing process.

In some embodiments, the heating element 30 may be a cooling element or a combined heating and cooling element. By this, the overheated steam may be cooled, or may be heated or cooled depending on the temperature of the overheated steam delivered from the steam generator 2 and the temperature of the overheated steam needed for treating the continuous material.

Figure 2:
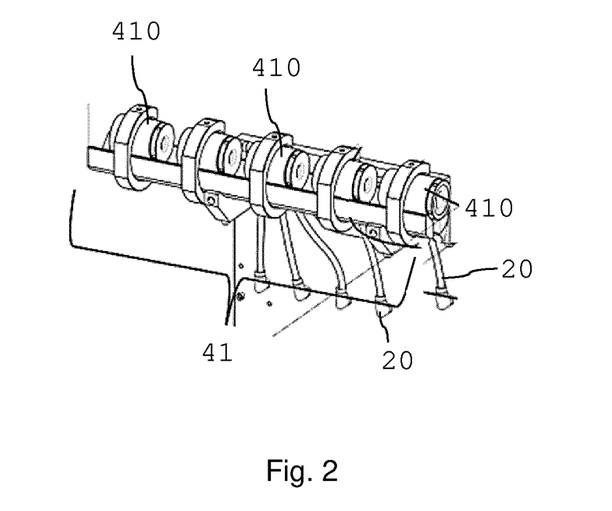
FIG. 2 shows a perspective view of a forming apparatus comprising several tubular element segments.

In FIG. 2, the forming device comprises a tubular element 41 realized by a plurality of separated elements, five tubular element segments 410, disposed in series along the feeding direction of the continuous material.

At least the pipe 20 leading to the first of the separated element segments 410 (most upstream arranged segment) is provided with a temperature control unit 3 (not shown). Preferably the pipes leading to the first and second of the separated element segments 410 are provided with a temperature control unit 3. Thus, at least the two most upstream arranged pipes 20 are made of a material resistant to the heat provided by the heating element 30.

Preferably, a last of the separated element segments 410 (most downstream arranged segment) is used for cooling the continuous rod, for example by guiding pressurized air to the interior of the element segment 410. A pipe 20 leading the pressurized cooling air to the last element segment 410 does not require the heat resistance of the pipes with the heating element and may thus be made of a less heat resistant material than the pipes provided with a heating element.

Figure 3:
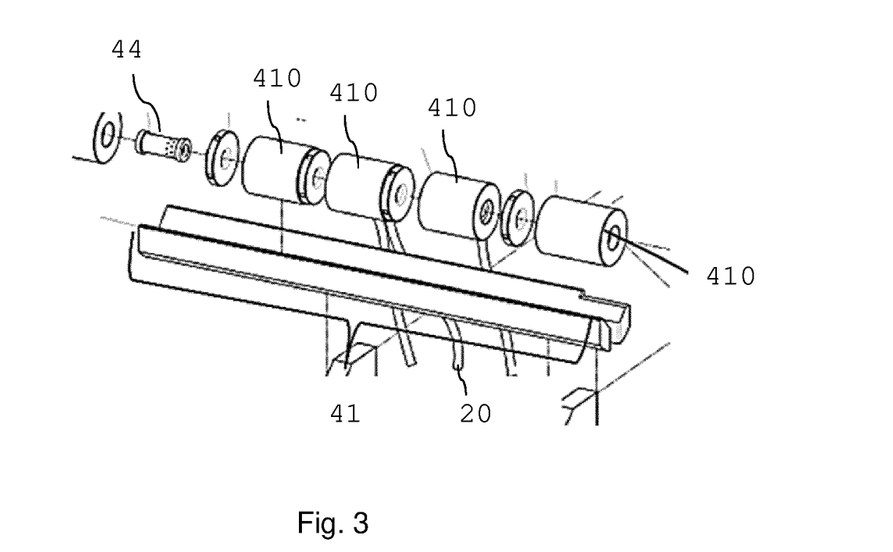
FIG. 3 shows a forming apparatus with formed inner tube within the tubular element segments.

In FIG. 3, the last one of the tubular element segments 410 when seen in transport direction of the tow material, is shown to comprise a formed inner tube 44 located within the tubular element segment 410. The tow passing through the tubular element segment 410 passes along the inner surface of the formed inner tube 44. The formed inner tube thus imparts its form onto the outside of the tow during the forming. Preferably, the formed inner tube comprises a substantially circular cross section. Particularly advantageously, the formed inner tube 44 creates a number of flutes along the periphery of the formed tow, for example for air to pass along the flutes. Preferably all tubular element segments 410 of the tubular element 41 comprise an inner tube 44. Most preferably, upstream arranged element segments 410 that are provided with overheated steam for heating the tow material are provided with an inner tube 44.

Figure 4:
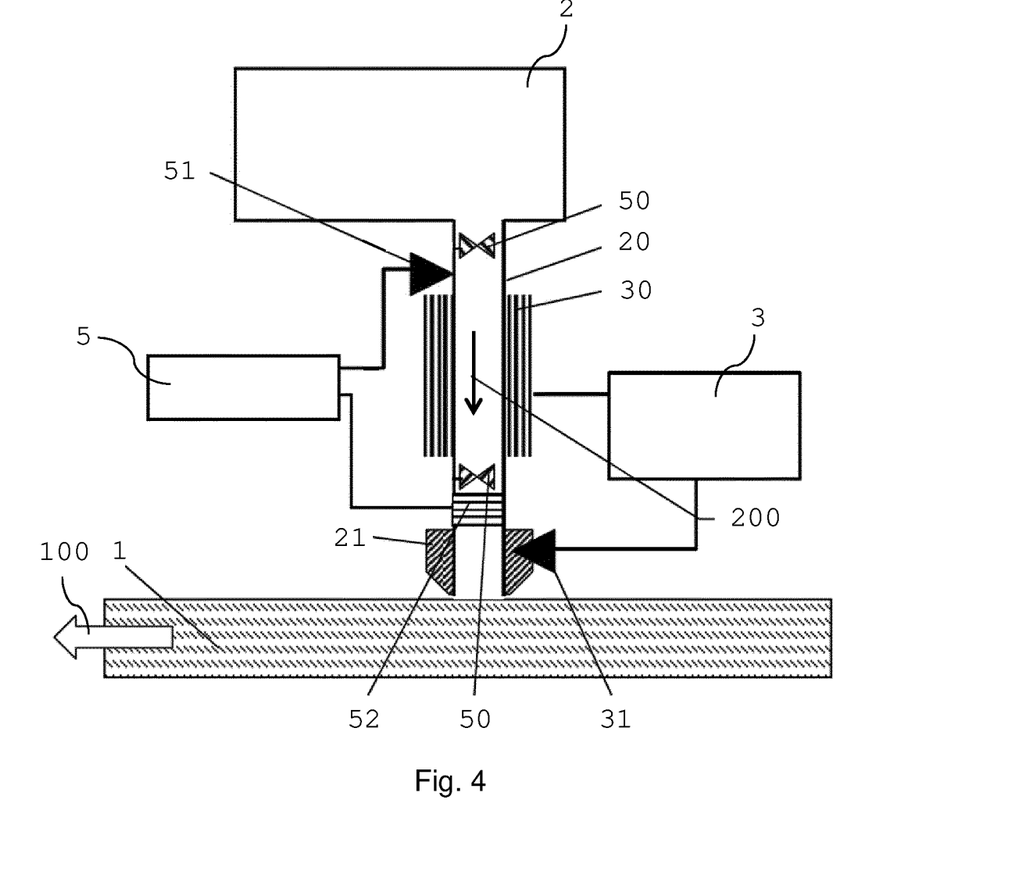
FIG. 4 is a schematic view of a forming apparatus with temperature and pressure control unit.

FIG. 4 shows in a simplified manner another example of a forming apparatus. The same or similar reference signs are used for the same or similar features as in FIG. 1.

The forming apparatus comprises a steam generator 2 and a steam distribution system wherein only one pipe 20 of the distribution system is shown. The pipe 20 is provided with a temperature control unit 3 provided in a pipe end section of the steam distribution system.

The pipe 20 is additionally provided with a pressure control unit 5. The pressure control unit 5 comprises a pressure sensor 51 for measuring the pressure of the overheated steam. The pressure sensor is arranged upstream of the heating element 30. The pressure control unit 5 also comprises a pressure influencer 50,52. The pressure influencer in the embodiment shown consists of two propellers 50 and a pressure regulator 52, for example a valve.

One of the propellers 50 is arranged in the pipe upstream of the pressure sensor 51. The second propeller 50 is arranged downstream of the heating element 30 but upstream of the pressure regulator 52 when seen in flow direction 200 of the overheated steam. Preferably, a velocity sensor is arranged at the position of the second propeller for measuring the velocity of the overheated steam. As the pressure regulator is arranged immediately upstream of the nozzle 21, where the overheated steam is introduced into the tubular element 41, with the pressure regulator, the pressure of the overheated steam to be applied to the tow material may be controlled and adjusted very precisely. In particular, any pressure increase possibly occurring due to a heating of the overheated steam, may be equalised by the pressure regulator 52.

The various sensors and actuators may measure and act on temperature, velocity and pressure of the overheated steam.

As already mentioned for the embodiment of the forming apparatus of FIG. 1, also the forming apparatus shown in FIG. 4 may comprise several pipes and more than one pipe may be provided with their own individually controlled temperature control unit 3 and with their own individually controlled pressure control unit 5.

Temperature and pressure control units 3,5 allow to adjust the temperature, pressure and velocity of the overheated steam after the overheated steam has left the steam generator 2 and basically at the exit of the one or several pipes 20. The serial provision of injection nozzles and temperature and pressure control units 3,5 allows to get, preferably independently, temperature and pressure profiles successively at different application points in the rod forming process.

This also applies if one or more downstream arranged pipes are used for cooling, for example by application of pressurized air. By measuring the temperature and pressure of the pressurized air applied to the tow material or to the already formed but not entirely stabilized rod, a controlled hardening and form stabilization may be achieved. This advantageously applies if the temperature and pressure is controlled sequentially in the cooling process.

Figure 5:
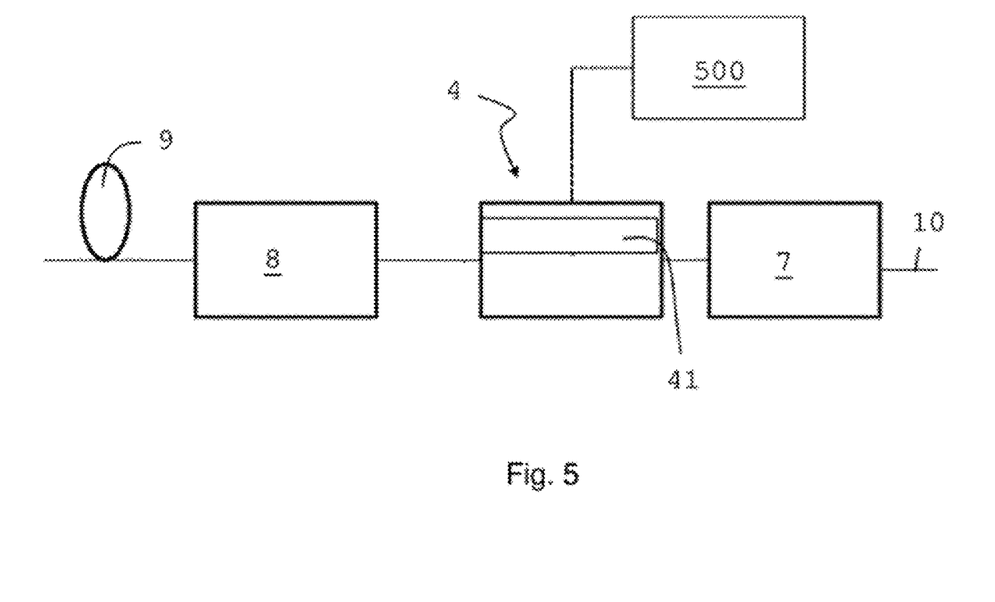
FIG. 5 schematically shows a continuous rod manufacturing line.

FIG. 5 shows a manufacturing line for producing continuous rods or continuous rod components, preferably for aerosol-generating articles. Preferably, hollow rods of cellulose acetate are manufactured that are cut into segments. These segments may be used in heat-not-burn aerosol-generating articles.

The manufacturing line comprises a transport device 10 to transport continuous material, for example cellulose acetate tow material, along a transport or feeding direction 100.

Along the manufacturing line a preparation unit 7 is arranged. The tow material is fed to the preparation unit 7 by the transport device 10. The preparation unit 7 is adapted to form a continuous stream of tow material, moistened with a hardening fluid or plasticizer, such as for example triacetin. In the embodiment of FIG. 5, the plasticizer unit is part of the preparation unit 7. Plasticizer units are known in the art. The plasticizer unit may also be located upstream of the preparation unit 7. Downstream of the preparation unit 7, the manufacturing line includes a forming apparatus 4, arranged in series to the preparation unit 7. The forming apparatus 4 is adapted to receive the flow of tow material and to cause hardening of the material to transform the tow material into a continuous axially rigid rod.

Advantageously, the manufacturing line further includes a wrapping unit 8, to wrap the rod in a wrapping paper. Further, the manufacturing line may comprise a cutting unit 9, preferably a rotating cutting head of known type. The cutting unit 9 is arranged downstream of the forming apparatus 4 and wrapping unit 9 and adapted to cut the rod into rod segments. A desired length of the segments in which the rod is cut is for example obtained with the assistance of an appropriate measuring device (not shown).

Suitable wrapping unit 8, transport device 10 and cutting unit 9 are known in the art and not further described.

The manufacturing line includes a main control system 500 adapted to receive and send signals from and to the forming apparatus 4. With the main control system 500, for example the heating or non-heating of a temperature control unit or, if present, a pressure regulator may be controlled. Preferably, the main control system 500 also controls further units of the manufacturing line, for example the preparation unit 7 and the transport device 10. Also the wrapping unit 8 and cutting unit 9 may be controlled by the main control system 500.

Figure 6:
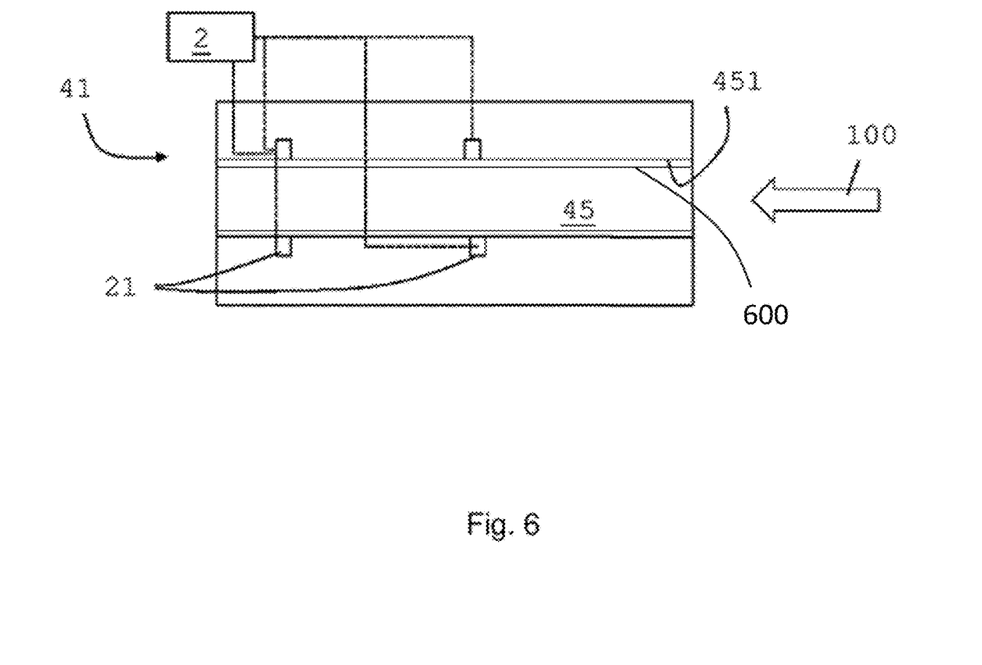
FIG. 6 is a schematic illustration of a forming apparatus for example used in the manufacturing line shown in FIG. 5.

The forming apparatus 4 is shown in an enlarged view in FIG. 6. The forming apparatus 4 comprises a tubular element 41 adapted to receive the tow material saturated with hardening material. The transport direction of the transport device 10, as well as the feeding direction of the tow material into the tubular element 41 of the forming apparatus 4 is depicted with arrow 100.

The tubular element 41 is adapted to shape the tow material to transform it into a generally cylindrical rod, for example into a full rod or into a hollow rod, and to advance the rod in the feed direction 100 to the further components of the manufacturing line.

The tubular element 41 defines a hole 45 through which the tow material can pass. Preferably, the hole 45 comprises an inner surface 451. The inner surface 451 compresses the tow material to form a substantially cylindrical rod-like shaped continuous tow of material. The inner surface 451 may, for example be an inner surface of a formed inner tube 44 as described in FIG. 3.

The tubular element 41 may comprise a mandrel 600 arranged inside the tubular element. The continuous tow material is then guided around and along the mandrel 600 and within the inner surface 451, thus forming a hollow tube of tow material.

The forming apparatus 4 further comprises a steam generator 2 in fluid connection with two circular nozzles (injection sites) 21 to inject pressurized overheated steam into the interior of the tubular element 41. The overheated steam hardens the plasticizer present in the tow material and transforms it into a substantially rigid rod.

In the embodiment of FIG. 6, the tubular element 41 is a single continuous tubular element comprising two injection sites for the overheated pressurized steam to act on the continuous material. Preferably, more than two, for example three to five nozzles 21 are present for injecting overheated steam or also pressurized air at three to five injections sites arranged along the tubular element 41.

The invention claimed is:

1. A forming apparatus comprising:
   a feed path for continuously feeding a continuous tow material along a transport direction; and
   a forming device connected to a downstream end of the feed path and adapted to form the continuous tow material into a continuous tubular rod, the forming device comprising:
      a tubular element adapted to allow the continuous tow material to pass through the tubular element to form the continuous tubular rod; and
      a steam generator adapted to generate overheated steam, the steam generator being in fluid connection with the tubular element to provide the overheated steam to the continuous tow material,
   wherein the forming device further comprises a plurality of fluid conduits to provide the overheated steam from the steam generator to a plurality of injection sites arranged along a length of the tubular element,
   wherein more than one fluid conduit of the plurality of fluid conduits comprises a temperature control unit comprising a temperature sensor and a temperature influencer,
   wherein an injection end of at least one of the plurality of fluid conduits comprises a nozzle,
   wherein the temperature sensor is arranged in the nozzle, and
   wherein the tubular element comprises a plurality of tubular element segments, wherein each tubular element segment of the plurality of tubular element segments comprises an injection site.

2. The forming apparatus according to claim 1, wherein at least one temperature control unit is arranged in an end section of a fluid conduit at the injection site.

3. The forming apparatus according to claim 1, wherein the temperature influencer is a heating device.

4. The forming apparatus according to claim 1, wherein each fluid conduit of the plurality of fluid conduits, comprises a temperature control unit.

5. The forming apparatus according to claim 1, wherein at least one fluid conduit of the plurality of fluid conduits comprises a pressure control unit comprising a pressure sensor and a pressure influencer.

6. The forming apparatus according to claim 5, wherein the pressure influencer is a pressure regulator capable to diminish a pressure.

7. The forming apparatus according to claim 5, wherein the pressure influencer is a pressure regulator capable to diminish and enhance a pressure.

8. The forming apparatus according to claim 1, wherein the tubular element comprises a mandrel for forming a continuous hollow tubular rod from the continuous tow material.

9. The forming apparatus according to claim 1, wherein the temperature influencer is a heating device and cooling device.

* * * * *